US012792906B2

(12) United States Patent
Emura

(10) Patent No.: US 12,792,906 B2
(45) Date of Patent: Nov. 10, 2026

(54) LEARNING APPARATUS, SIGNAL ESTIMATION APPARATUS, LEARNING METHOD, SIGNAL ESTIMATION METHOD, AND PROGRAM TO DEQUANTIZE

(71) Applicant: NTT, Inc.

(72) Inventor: Satoru Emura, Tokyo (JP)

(73) Assignee: NTT, Inc., Tokyo (JP)

( * ) Notice: Subject to any disclaimer, the term of this patent is extended or adjusted under 35 U.S.C. 154(b) by 1096 days.

(21) Appl. No.: 17/797,686

(22) PCT Filed: Feb. 7, 2020

(86) PCT No.: PCT/JP2020/004866

§ 371 (c)(1),
(2) Date: Aug. 4, 2022

(87) PCT Pub. No.: WO2021/157062

PCT Pub. Date: Aug. 12, 2021

(65) Prior Publication Data

US 2023/0153603 A1 May 18, 2023

(51) Int. Cl.
*G06N 3/08* (2023.01)
*G06N 3/0464* (2023.01)

(52) U.S. Cl.
CPC ............. *G06N 3/08* (2013.01); *G06N 3/0464* (2023.01)

(58) Field of Classification Search
CPC ............................... G06N 3/08; G06N 3/0464
See application file for complete search history.

(56) References Cited

U.S. PATENT DOCUMENTS 6,587,984 B1 * 7/2003 Tsukamoto ......... H03M 1/1038 341/51
10,062,035 B1 * 8/2018 Shaked .................. G06N 20/00
(Continued)

FOREIGN PATENT DOCUMENTS

JP 2010268446 A 11/2010
JP 2011180479 A 9/2011
WO 2018216207 A1 11/2018

OTHER PUBLICATIONS

Weidong Cao et.al. (hereinafter Cao) Neural Network-Inspired Analog-to-Digital Conversion to Achieve Super-Resolution with Low-Precision RRAM Devices, arXiv:1911.12815v1 [cs.LG] Nov. 28, 2019. (Year: 2019).*

(Continued)

*Primary Examiner* — Li B. Zhen
*Assistant Examiner* — Tirumale K Ramesh

(57) ABSTRACT

A neural network is learned that uses learning data including a low-bit signal obtained by quantizing a signal to a first number of quantization bits and a high-bit signal obtained by quantizing the signal to a second number of quantization bits larger than the first number of quantization bits, to receive as an input a low-bit input signal obtained by quantizing an input signal to the first number of quantization bits and output an estimated signal of a high-bit output signal obtained by quantizing the input signal to the second number of quantization bits. This neural network has a multilayer structure including an input layer and an output layer, and obtains and outputs an estimated signal of a high-bit output signal obtained by adding to a low-bit input signal a signal output from the output layer in response to the low-bit input signal being input to the input layer.

15 Claims, 6 Drawing Sheets

(56) References Cited

U.S. PATENT DOCUMENTS

| | | | | |
|---|---|---|---|---|
| 10,140,573 | B2 * | 11/2018 | Julian | G06N 3/048 |
| 2010/0262639 | A1 | 10/2010 | Suzuki et al. | |
| 2019/0132591 | A1 * | 5/2019 | Zhang | H04N 19/59 |
| 2020/0159534 | A1 * | 5/2020 | Li | G06F 9/3016 |
| 2020/0205771 | A1 * | 7/2020 | Barsimantov | A61B 7/00 |
| 2020/0302576 | A1 | 9/2020 | Xu et al. | |
| 2021/0211163 | A1 * | 7/2021 | Ait Aoudia | H04B 7/0413 |

OTHER PUBLICATIONS

Olexa Bilaniuk et.al, Bit-Slicing FPGA Accelerator for Quantized Neural Networks, 2019 IEEE International Symposium on Circuits and Systems (ISCAS). IEEE, 2019. (Year: 2019).*

Akira Nishimura (2019) "Prediction and extension of lower bits of linearly quantized audio waveform using amplitude of higher bit values" Proceedings of the Acoustic Society of Japan, Mar. 2019.

* cited by examiner

LEARNING APPARATUS, SIGNAL ESTIMATION APPARATUS, LEARNING METHOD, SIGNAL ESTIMATION METHOD, AND PROGRAM TO DEQUANTIZE

CROSS-REFERENCE TO RELATED APPLICATIONS

This application is a U.S. National Stage Application filed under 35 U.S.C. § 371 claiming priority to International Patent Application No. PCT/JP2020/004866, filed on 7 Feb. 2020, the disclosure of which is hereby incorporated herein by reference in its entirety.

TECHNICAL FIELD

The present invention relates to a technique for obtaining from a quantization signal a quantization signal with the number of quantization bits being extended.

BACKGROUND ART

Currently, analog signals from sensors are quantized (digitized) by A/D conversion, and taken into a computer where they are processed. For example, in robots and the like, various sensor signals are often quantized to 10 to 16 bits. Further, in music CDs, the music signals are quantized to 16 bits.

There is a need to extend the number of quantization bits for a signal quantized as described above. For example, there may be a case where it is necessary to obtain, from a signal in which a sensor signal has a large amount of quantization errors due to its small amplitude, a smooth signal in which the quantization errors are reduced. Further, for music CDs, there is a need to extend 16-bit encoded music to 24-bit encoded music. In such extension of the number of quantization bits to reduce the quantization errors, the number of bits on the lower bit side (number of low-order bits) is extended.

Especially under the assumption of music, there have been proposed some methods for estimating a digital signal in which the number of quantization bits for a known digital signal is extended. For example, in PTL 1, an FIR or IIR filter is applied to an upper bit waveform to estimate a low-order bit signal of a digital signal in which the number of quantization bits is extended. In PTL 2, in a section where the same amplitude value is continuous, an intermediate time point is determined based on the ratio between widths of variation of amplitude values before and after the section, and spline interpolation is performed on three points: an amplitude value assumed at the intermediate time point and the amplitude values at both ends of the section. The resulting real amplitude value is rounded off and quantized to obtain a low-order bit value. In NPL 1, a linear prediction coefficient is obtained from a high-order bit signal by Burg's method. A low-order bit signal whose initial value is randomly set is generated and added to the high-order bit signal to obtain an initial prediction signal. A prediction error signal is obtained from the initial prediction signal, and the optimum arrangement of bit values of the low-order bit signal is searched for and obtained by simulated annealing such that the prediction error signal is minimized.

CITATION LIST

Patent Literature

[PTL 1] Japanese Patent Application Publication No. 2010-268446

[PTL 2] Japanese Patent Application Publication No. 2011-180479

Non Patent Literature

[NPL 1] Akira Nishimura, "*Senkeiryousika onkyousingou no shinpuku zyoui bittoti wo motiita kai bittoti no yosoku kakutyou* (Prediction and extension of low-order bit value using amplitude high-order bit value of linearly quantized acoustic signal)", Proceedings of the Acoustical Society of Japan 2019, March 2019

SUMMARY OF THE INVENTION

Technical Problem

However, in the above method, it is unclear whether the fine information of the original signal of interest is reflected in the estimation result. This is because the number of quantization bits is extended using only the information of a digital signal before the number of quantization bits is extended, so that the original characteristics of the digital signal quantized to a larger number of quantization bits are not used.

The present invention has been made in view of such issues, and an object of the present invention is to reflect the fine information of the original signal to extend the number of quantization bits with high accuracy.

Means for Solving the Problem

A neural network is learned that uses learning data including a low-bit signal obtained by quantizing a signal to a first number of quantization bits and a high-bit signal obtained by quantizing the signal to a second number of quantization bits larger than the first number of quantization bits, to receive as an input a low-bit input signal obtained by quantizing an input signal to the first number of quantization bits and output an estimated signal of a high-bit output signal obtained by quantizing the input signal to the second number of quantization bits. This neural network has a multilayer structure including an input layer and an output layer, and obtains and outputs an estimated signal of a high-bit output signal obtained by adding to a low-bit input signal a signal output from the output layer in response to the low-bit input signal being input to the input layer.

Effects of the Invention

As a result, it is possible to reflect the fine information of the original signal to extend the number of quantization bits with high accuracy.

DESCRIPTION OF EMBODIMENTS

Hereinafter, embodiments of the present invention will be described with reference to the drawings.

Each embodiment is an example of a method of estimating, by a neural network, information of low-order bits that has been dropped out by quantization from a quantized signal. The neural network is learned using, as training data, signals before and after low bit quantization, that is, a signal quantized to a low number of bits and a signal quantized to a high number of bits. When the signal quantized to the high number of bits in the training data is used for learning of the neural network, the fine information of the original input signal is utilized. In the embodiment, as an example, a gated neural network such as a gated convolutional neural network (Gated CNN) (Reference 1) is used.

[Reference 1] Y. N. Dauphin, A. Fan, M. Auli, and D. Grangier, "Language Modeling with Gated Convolutional Networks", arXiv: 1612.08083, Submitted on 23 Dec. 2016 (v1).

Specifically, in learning processing of the embodiment, learning data is used including a low-bit signal obtained by quantizing a signal to a first number of quantization bits (the low number of bits) and a high-bit signal obtained by quantizing the signal to a second number of quantization bits (the high number of bits) larger than the first number of quantization bits (the low number of bits). Then, in the learning processing of the embodiment, the neural network is learned which receives as an input a low-bit input signal obtained by quantizing an input signal to the first number of quantization bits and outputs an estimated signal of a high-bit output signal obtained by quantizing the input signal to the second number of quantization bits. Here, the neural network to be learned has a multilayer structure including an input layer and an output layer, and obtains and outputs an estimated signal of the high-bit output signal obtained by adding to the low-bit input signal a signal output from the output layer in response to the low-bit input signal being input to the input layer. The details will be described below.

First Embodiment

Figure 1A:
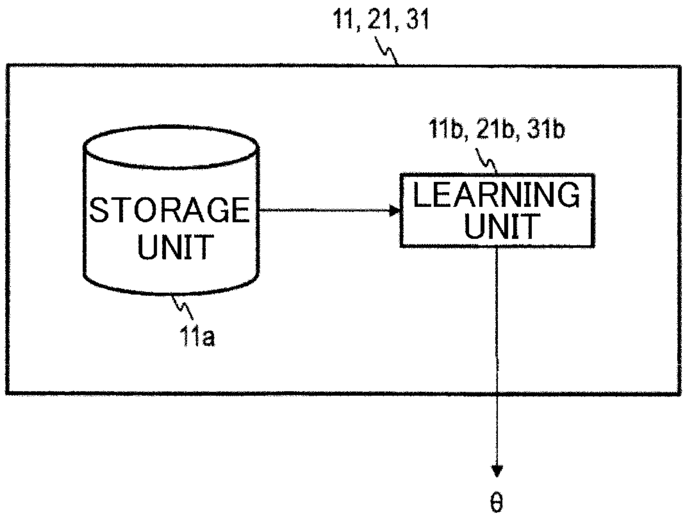
FIG. 1A is a block diagram illustrating an example of a learning device according to an embodiment.
Figure 1B:
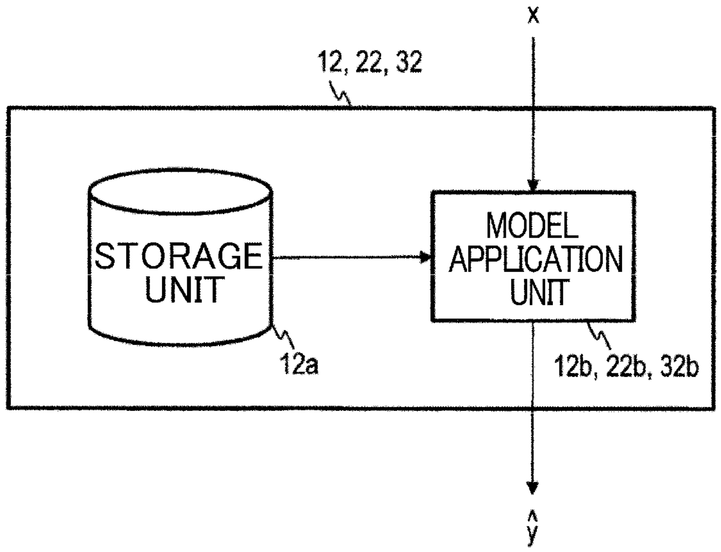
FIG. 1B is a block diagram illustrating an example of a signal estimation device according to the embodiment.

As illustrated in FIG. 1A by way of example, a learning device 11 according to a first embodiment includes a storage unit 11*a* and a learning unit 11*b*. As illustrated in FIG. 1B by way of example, a signal estimation device 12 according to the first embodiment includes a storage unit 12*a* and a model application unit 12*b*.

<Learning Processing>

Figure 2:
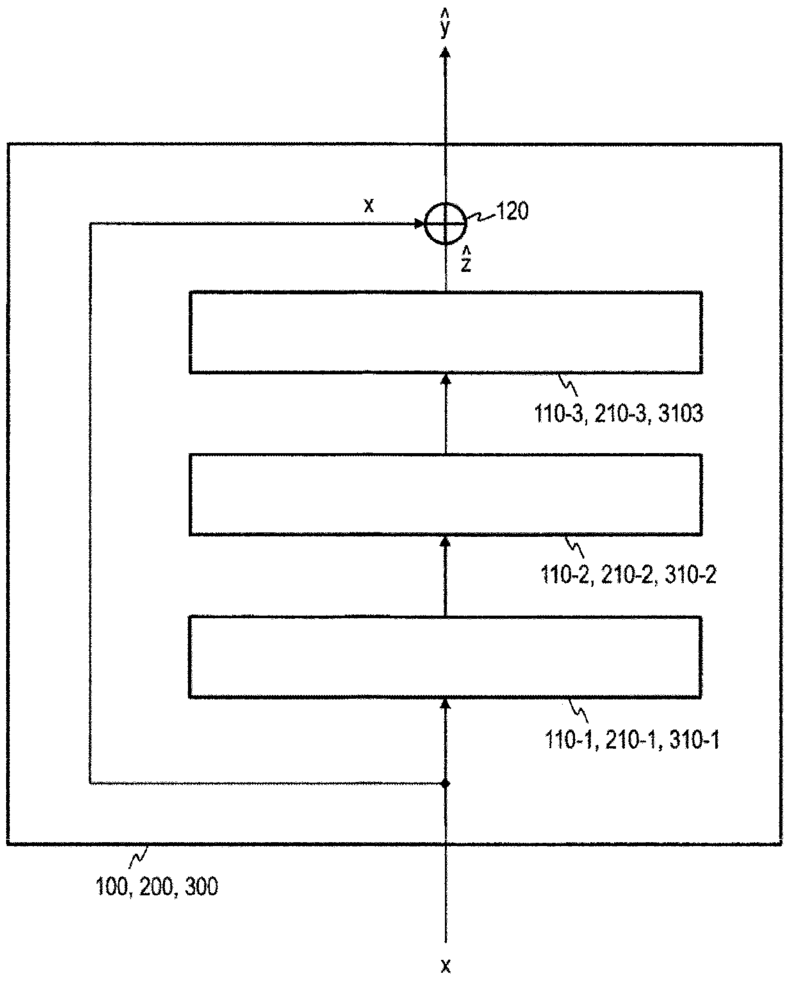
FIG. 2 is a block diagram illustrating an example of a neural network according to the embodiment.

First, learning processing will be described that is for a neural network which receives as an input a low-bit input signal obtained by quantizing an input signal to the low number of bits and outputs an estimated signal of a high-bit output signal obtained by quantizing the input signal to the high number of bits. FIG. 2 illustrates a neural network 100 according to the present embodiment that estimates information of low-order bits that has been dropped out by quantization. The neural network 100 receives as an input a low-bit input signal x, in a frame (section) composed of L samples of signals, obtained by quantizing an input signal to the low number of bits, and outputs an estimated signal y^ of a high-bit output signal, in a frame composed of L samples of signals, obtained by quantizing the input signal to the intended high number of bits. Note that the input signal x is, for example, a time-series signal, and is, for example, a time-series acoustic signal. For example, the input signal x may be an acoustic signal in the time domain or an acoustic signal in the time frequency domain. Here, L is a positive integer, for example, L is a value of or around several hundreds to 1000. Further, x and y^ are, for example, L-dimensional vectors. Further, as illustrated in FIG. 2 by way of example, the superscript "^" of "y^" is originally placed directly on "y", but due to the limitation of the description notation, it may be represented as "y^" in which "^" is placed at the upper right corner of "y". The same applies to other letters and superscripts. As illustrated in FIG. 2 by way of example, the neural network 100 has a multilayer structure including an input layer 110-1 and an output layer 110-3. Then, the neural network 100 obtains and outputs an estimated signal y^=z^+x of a high-bit output signal obtained by adding to the low-bit input signal x a signal z^, in a frame composed of L samples of signals, output from the output layer 110-3 in response to the low-bit input signal x being input to the input layer 110-1. Here, z^ is, for example, an L-dimensional vector. For example, a predetermined time section of a low-bit time-series signal is set as a frame; while the frame is shifted by ½, ¼, or the like, an input low-bit input signal x is taken out from the resulting frame and input to the neural network 100; a signal z^ is set in which the resulting outputs from the multilayer structure are synthesized; the received low-bit input signal x is added to the signal z^ as it is before the final output to obtain an estimated signal of a high-bit output signal y^=z^+x; and the estimated signal y^ is subjected to a window function for synthesis. Note that the multilayer structure of the neural network 100 illustrated in FIG. 2 by way of example is a three-layer structure of the input layer 110-1, a hidden layer 110-2, and the output layer 110-3, but it may be a single-layer structure or a two-layer structure, or may be a structure of four or more layers. Note that, in the case of the single-layer structure, the input layer also serves as the output layer. In the case of the two-layer structure, there is no hidden layer. In the case of the four or more layers, there are two or more hidden layers. Hereinafter, the input layer 110-1, the hidden layer 110-2, and the output layer 110-3 may be simply referred to as layers 110-1, 110-2, and 110-3, respectively. Accordingly, the multilayer structure includes N layers 110-1, . . . , 110-N. Here, Nis an integer of 1 or more.

The learning of the neural network 100 is performed using a large amount of training data (x', y') including a low-bit signal x', in a frame composed of L samples of signals, obtained by quantizing a signal to the low number of bits (the first number of quantization bits) and a high-bit signal y', in a frame composed of L samples of signals, obtained by quantizing the signal to the high number of bits (the second number of quantization bits). Specifically, the neural network 100 is learned so that the distance between the high-bit signal y' and an estimated signal y^=z^+x' of the high-bit output signal output from the neural network 100 to which the low-bit signal x' is input as the low-bit input signal x is minimized. Specifically, each layer in the multilayer structure of the neural network 100 is learned so that z^=y^−x' output from the output layer 110-3 in response to the low-bit signal x' being input to the input layer 110-1 as the low-bit input signal x approaches the difference y'−x' between the high-bit signal y', which is the target signal, and the corresponding low-bit signal x'. Note that x' and y' are, for example, L-dimensional vectors. In this way, the neural network 100 used in the present embodiment has a skip connection structure that obtains and outputs an estimated signal y'=z^+x' of a high-bit output signal obtained by adding to the low-bit input signal x a signal z^ output from the output layer 110-3 in response to the low-bit input signal x being input to the input layer 110-1. This skip connection structure limits the learning range, so that the estimation accuracy of the neural network 100 obtained by learning is improved.

Each layer 110-*i* (where i=1, 2, 3) in the multilayer structure of the neural network 100 may be composed of, for example, a CNN or a Gated CNN. For example, in the case where the layer 110-*i* is composed of a CNN, in each layer 110-*i*, an input X is subjected to convolution linear transformation processing W and further to an activation function σ to obtain an output h(X). For example, the filter length of the convolution linear transformation processing W is 3 to several tens of taps. By increasing the types of filters, the number of feature vectors, that is, the number of channels, can be increased. The output h(X) of the layer 110-*i* composed of the CNN with respect to the input X is expressed by the following Equation (1).

$$h(X)=\sigma(X*W+b) \quad (1)$$

Here, "*" is a convolution operator. Since both the input and output take a positive or negative value, for example, a function that outputs a positive or negative value (e.g., a tanh function (hyperbolic tangential function, Tangent Hyperbolic Function)) is used as the activation function σ. On the other hand, in the case where the layer 110-*i* is composed of a Gated CNN, the output h(X) of the layer 110-*i* composed of the Gated CNN with respect to the input X is obtained by a product of a column of a plurality of elements obtained by performing the convolution linear transformation processing Won the input X and a column of a plurality of elements obtained by performing convolution linear transformation processing V on the input X on an element basis. For example, the output h(X) is expressed by the following Equation (2).

[Math. 1]

$$h(X)=\sigma(X*W+b)\otimes\sigma(X*V+c) \quad (2)$$

Figure 3:
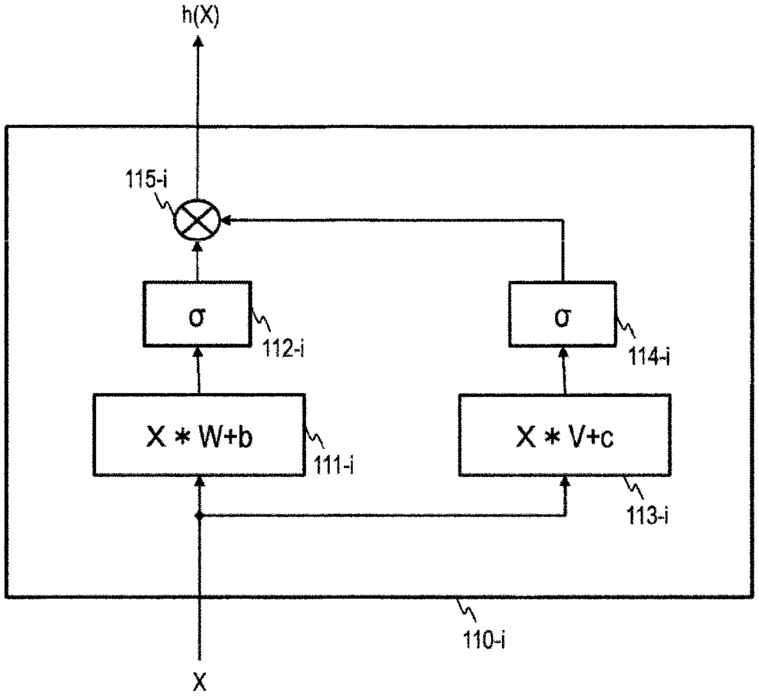
FIG. 3 is a block diagram illustrating an example of the neural network according to the embodiment.

Here,

[Math. 2]

$$\otimes$$

is an element-wise product (a product on an element basis), σ is an activation function, V is convolution linear transformation processing, and b and c are constant vectors. The input/output size of V is the same as that of W. For example, the filter length of the convolution linear transformation processing V is 3 to several tens of taps. In this case as well, since both the input and output take a positive or negative value, for example, a function that outputs a positive or negative value (e.g., tanh) is used as the activation function σ. FIG. 3 illustrates an example of the layer 110-*i* composed of a Gated CNN. In the example of FIG. 3, the convolution linear transformation processing W is applied to the input X of the layer 110-*i* by a convolution linear transformation processing unit 111-*i*, b is added to the result, to obtain X*W+b, and further the activation function σ is applied to X*W by an activation function unit 112-*i* to obtain σ(X*W+b). Further, the convolution linear transformation processing V is applied to the input X of the layer 110-*i* by a convolution linear transformation processing unit 113-*i*, c is added to the result, to obtain X*V+c, and further the activation function σ is applied to X*V+c by an activation function unit 114-*i* to obtain σ(X*V+c). Then, σ(X*W+b) and σ(X*V+c) are input to a multiplication unit 115-*i*, and the multiplication unit 115-*i* obtains and outputs an output h(X) according to Equation (2). Note that batch normalization and dropout may be included between the Gated CNNs as appropriate (Reference 2).

Reference 2: Ian Goodfellow, Y. Bengio, and A. Courville, "Deep Learning", MIT Press, 2016.

As a loss cost function loss used for learning of the neural network 100, for example, a function of the following Equation (3) can be used by way of example.

[Math. 3]

$$\text{loss}=\|y'-\hat{y}\|_1 \quad (3)$$

Here, $\|\bullet\|_1$ represents the L1 norm of "•". Specifically, for example, learning is performed using as the loss cost function loss the L1 norm of a difference y'−y^ vector between the high-bit signal y' included in the training data (x', y') and the estimated signal y^ of the high-bit output signal output from the neural network 100 in response to the low-bit signal x' corresponding to the high-bit signal y' being input as the low-bit input signal x.

The flow of learning will be described with reference to FIG. 1A. As a premise, the learning data (x', y') is stored in the storage unit 11*a* of the learning device 11. The learning unit 11*b* reads the learning data (x', y') from the storage unit 11*a*. Then, the learning unit 11*b* learns parameters θ for identifying the neural network 100 so that the distance between the high-bit signal y' and an estimated signal y^=z^+x' of the high-bit output signal output from the neural network 100 to which the low-bit signal x' is input as the low-bit input signal x is minimized. In that learning, for example, the parameters θ are learned by a known back-propagation method or the like using the loss cost function loss of Equation (3). The learning device 11 outputs the parameters θ obtained by learning.

<Signal Estimation Processing>

Next, with reference to FIG. 1B, signal estimation processing will be described that estimates a high-bit output signal from a low-bit input signal by using the neural network 100 learned as described above. As a premise of the signal estimation processing, information for identifying and using the neural network 100 learned as described above is stored in the storage unit 12*a* of the signal estimation device 12. For example, the learned parameters θ of the neural network 100 are stored in the storage unit 12*a*.

Under this premise, the following processing is performed. A low-bit input signal x, in a frame composed of L samples of signals, obtained by quantizing an input signal to the low number of bits (the first number of quantization bits) is input to the model application unit 12*b*. The model application unit 12*b* extracts the information for identifying the neural network 100 from the storage unit 12*a*. The model application unit 12*b* inputs to the neural network 100 the low-bit input signal x obtained by quantizing the input signal to the low number of bits, and outputs an estimated signal y^ of a high-bit output signal obtained by quantizing the input signal to the high number of bits (the second number of quantization bits larger than the first number of quantization bits).

Second Embodiment

Next, a second embodiment will be described. Hereinafter, the same reference numerals will be referred to for the matters already described to simplify their explanation. The output h(X) is not limited to the above Equation (2), and may be any as long as it can be obtained by a product of a column of a plurality of elements obtained by performing the convolution linear transformation processing Won the input X and a column of a plurality of elements obtained by performing the convolution linear transformation processing V on the input X on an element basis. In the second embodiment, the processing of the following Equation (4) is performed instead of Equation (2) as the Gated CNN for the input X.

[Math. 4]

$$h(X)=(X*W+b)\otimes\sigma(X*V+c) \quad (4)$$

The difference of Equation (4) of the second embodiment from Equation (2) of the first embodiment is that the activation function σ is not applied to the first term, whereby X is output through linear transformation processing and amplitude control processing. The processing of Equation (4) has high linearity for the output h(X) with respect to the input X, and accordingly it is easy to have multiple layers.

As illustrated in FIG. 1A by way of example, a learning device 21 according to the second embodiment includes the storage unit 11*a* and a learning unit 21*b*. As illustrated in FIG. 1B by way of example, a signal estimation device 22 according to the second embodiment includes the storage unit 12*a* and a model application unit 22*b*.

<Learning Processing>

FIG. 2 illustrates an example of a neural network 200 according to the present embodiment. The difference of the neural network 200 from the neural network 100 is that the input layer 110-1, the hidden layer 110-2, and the output layer 110-3 are replaced with an input layer 210-1, a hidden layer 210-2, and an output layer 210-3, respectively. Others are as described in the first embodiment.

Figure 4:
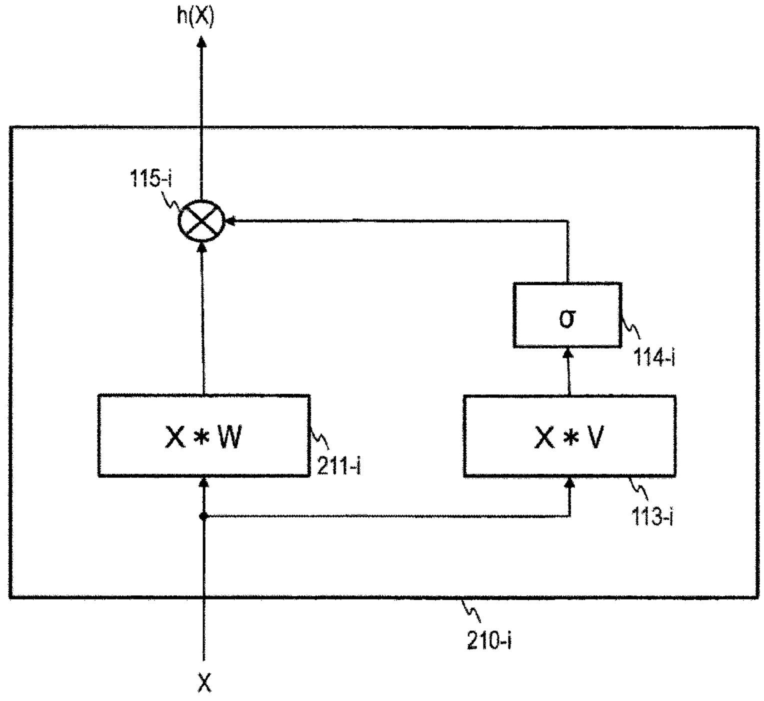
FIG. 4 is a block diagram illustrating an example of the neural network according to the embodiment.

FIG. 4 illustrates an example of each layer 210-*i* (where i=1, 2, 3) in the multilayer structure of the neural network 200. As illustrated in FIG. 4 by way of example, the output h(X) of each layer 210-*i* with respect to the input X is obtained by the processing of the above Equation (4). In the example of FIG. 4, the convolution linear transformation processing W is applied to the input X of the layer 210-*i* by the convolution linear transformation processing unit 111-*i* to obtain X*W+b. Further, the convolution linear transformation processing V is applied to the input X of the layer 210-*i* by the convolution linear transformation processing unit 113-*i* to obtain X*V+c, and further the activation function σ is applied to X*V+c by the activation function unit 114-*i* to obtain σ(X*V+c). Then, X*W+b and σ(X*V+c) are input to a multiplication unit 115-*i*, and the multiplication unit 115-*i* obtains and outputs an output h(X) according to Equation (4).

The learning unit 21*b* (FIG. 1A) of the learning device 21 learns the neural network 200 instead of the neural network 100. The details of the learning method according to the present embodiment are as described in the first embodiment except that the neural network 200 is used instead of the neural network 100.

<Signal Estimation Processing>

The model application unit 22*b* (FIG. 1B) of the signal estimation device 22 inputs the low-bit input signal x to the neural network 200 instead of the neural network 100, and obtains and outputs the estimated signal y^ of the high-bit output signal. The details of the signal estimation processing according to the present embodiment are as described in the first embodiment except that the neural network 200 is used instead of the neural network 100.

Third Embodiment

Next, a third embodiment will be described. Instead of the Gated CNN for the input X, a layer with more complex gate control may be used. For example, the output h(X) may be a product A×V', where A is a column corresponding to a product of a column K of a plurality of elements obtained by performing convolution linear transformation processing $W_K$ on the input X and a column Q of a plurality of elements obtained by performing convolution linear transformation processing $W_Q$ on the input X, and V' is a column of a plurality of elements obtained by performing convolution linear transformation processing $W_V$ on the input X. In the present embodiment, layers using the attention structure of Reference 2 are described by way of example.

Reference 2: A. Vaswani, et al., "Attention is all you need", arXiv: 1706.03762, submitted on 12 Jun. 2017.

As illustrated in FIG. 1A by way of example, a learning device 31 according to the third embodiment includes the storage unit 11*a* and a learning unit 31*b*. As illustrated in FIG. 1B byway of example, a signal estimation device 32 according to the third embodiment includes the storage unit 12*a* and a model application unit 32*b*.

<Learning Processing>

FIG. 2 illustrates an example of a neural network 300 according to the present embodiment. The difference of this neural network 300 from the neural network 100 is that the input layer 110-1, the hidden layer 110-2, and the output layer 110-3 are replaced with an input layer 310-1, a hidden layer 310-2, and an output layer 310-3, respectively. Others are as described in the first embodiment.

Figure 5:
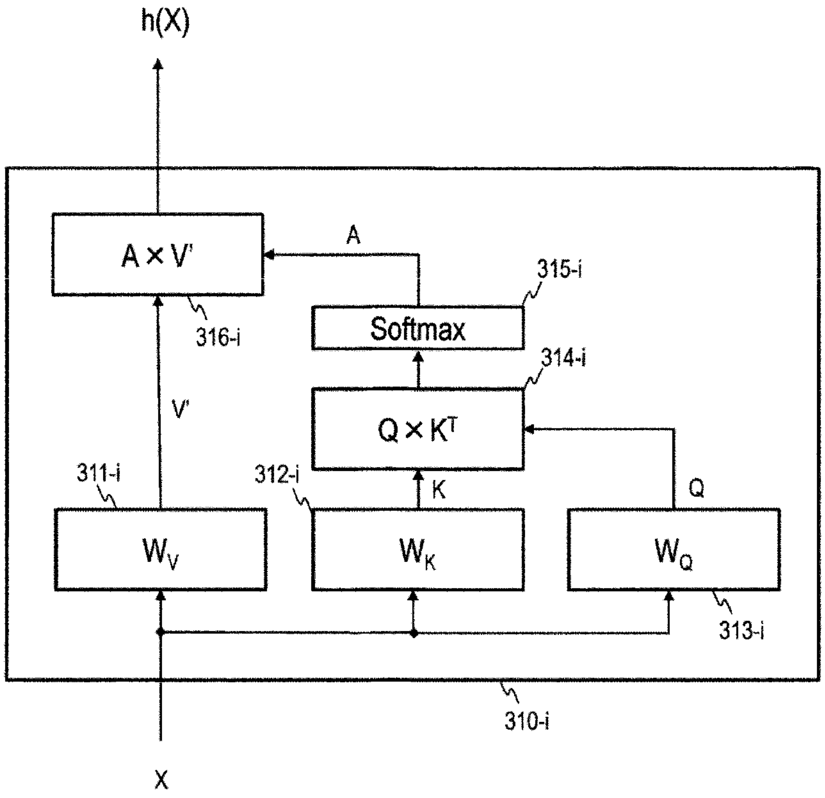
FIG. 5 is a block diagram illustrating an example of the neural network according to the embodiment.

FIG. 5 illustrates an example of each layer 310-*i* (where i=1, 2, 3) in the multilayer structure of the neural network 200. In the example of FIG. 5, a convolution linear transformation processing unit 312-*i* applies the linear transformation processing $W_K$ to the input X of the layer 310-*i* to obtain and output the key K. Similarly, a convolution linear transformation processing unit 313-*i* applies the linear transformation processing $W_Q$ to the input X to obtain and output the Query Q. Similarly, a convolution linear transformation processing unit 311-*i* applies the linear transformation processing $W_V$ to the input X to obtain and output the Value V'. A multiplication unit 314-*i* receives Q and K as inputs, multiplies Q and K to obtain and output $Q \times K^T$. Here, $\bullet^T$ is a transpose of "•". A softmax processing unit 315-*i* receives $Q \times K^T$ as an input and performs softmax processing on $Q \times K^T$ (applies a softmax function) to obtain and output the attention A. A multiplication unit 316-*i* receives V' and A as inputs, and multiplies this attention A by V' to obtain the final output h(X)=A×V'. The $W_K$, $W_Q$, and softmax processing form a gate that is more complicated than that of the first embodiment, and have a function of focusing on and emphasizing a part of V'. Adopting such an attention configuration makes it possible to reflect the characteristics of the original input signal in the estimation of a higher-bit output signal.

The learning unit 31*b* (FIG. 1A) of the learning device 31 learns the neural network 300 instead of the neural network 100. The details of the learning method according to the present embodiment are as described in the first embodiment except that the neural network 300 is used instead of the neural network 100.

<Signal Estimation Processing>

The model application unit 32*b* (FIG. 1B) of the signal estimation device 32 inputs the low-bit input signal x to the neural network 300 instead of the neural network 100, and obtains and outputs the estimated signal y^ of the high-bit output signal. The details of the signal estimation processing according to the present embodiment are as described in the first embodiment except that the neural network 300 is used instead of the neural network 100.

[Verification Experiment]

A verification experiment was conducted for the first and third embodiments. For the learning processing of a neural network, 280 voices each having a length of 3 to 5 seconds were used, and for the signal estimation processing and the evaluation, other 70 voices each having a length of 3 to 5 seconds were used.

For the first embodiment, a neural network composed of 8 Gated CNN layers having a kernel size of 17 and 48 channels was used. In the case where the effective bits of a 16-bit signal are set to 8 bits, the signal-to-distortion ratio (SDR) of the input signal x and the SDR of the estimated signal y^ of the high-bit output signal obtained by the method according to the first embodiment were compared with each other, and an improved amount of SDR was obtained as follows.

TABLE 1

| Effective number of bits for input signal | Improved amount of SDR |
|---|---|
| 8 | 3.03 dB |

For the third embodiment, a neural network composed of 4 attention structure layers having a kernel size of 17 and 48 channels was used. In the case where the effective bits of a 16-bit signal are set to 8 bits, the signal-to-distortion ratio (SDR) of the input signal x and the SDR of the estimated signal y^ of the high-bit output signal obtained by the method according to the third embodiment were compared with each other, and an improved amount of SDR was obtained as follows.

TABLE 2

| Effective number of bits for input signal | Improved amount of SDR |
|---|---|
| 8 | 2.30 dB |

It was found that the SDR was improved by using the neural network in any of the methods according to the first and third embodiments.

[Hardware Configuration]

The learning devices 11, 21, 31 and the signal estimation devices 12, 22, 32 in the respective embodiments are each, for example, a device implemented by a general-purpose or dedicated computer executing a predetermined program, where the computer includes a processor (hardware processor) such as a CPU (central processing unit), a memory such as a RAM (random-access memory) and a ROM (read-only memory), and the like. This computer may include one processor and one memory, or may have a plurality of processors and memories. This program may be installed in the computer or may be recorded in the ROM or the like in advance. Further, some or all of the processing units may be configured with an electronic circuit that realizes a processing function independently, instead of an electronic circuit (circuitry) such as a CPU that reads a program to realize a function configuration. Further, an electronic circuit constituting one device may include a plurality of CPUs.

Figure 6:
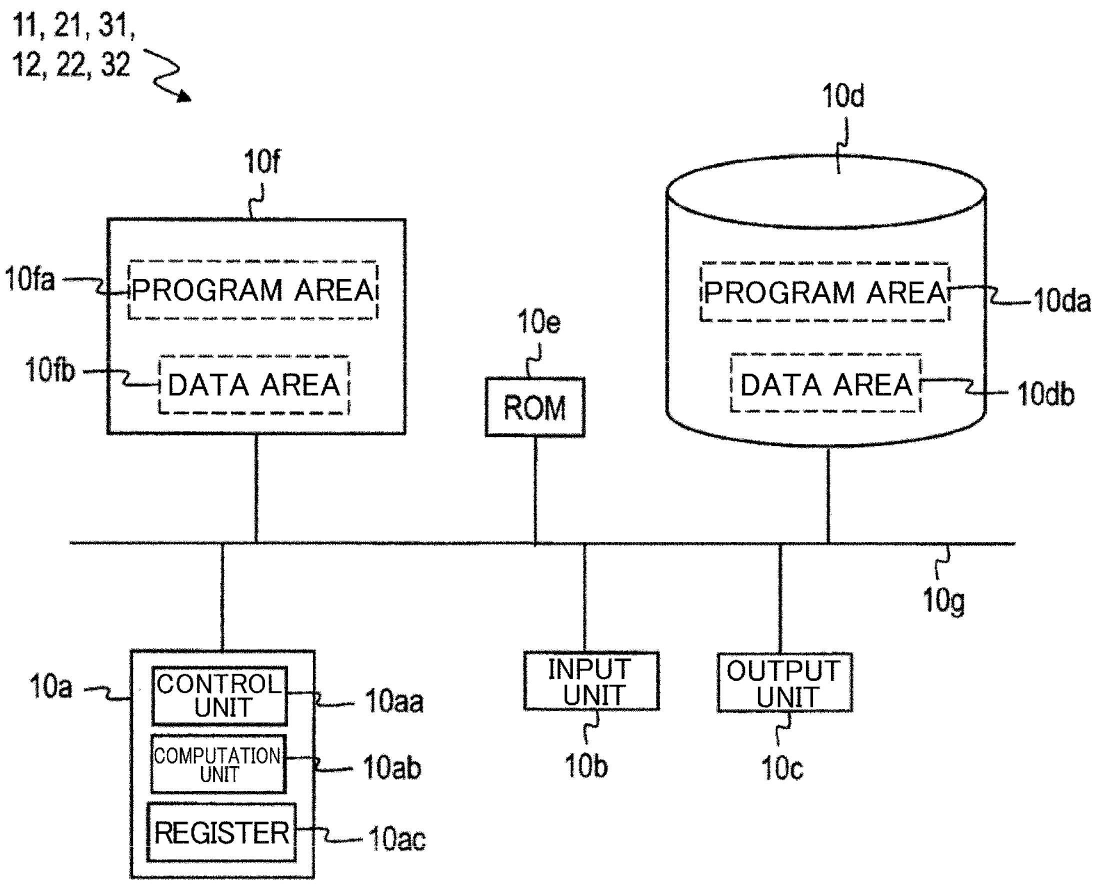
FIG. 6 is a block diagram illustrating an example of a hardware configuration according to the embodiment.

FIG. 6 is a block diagram illustrating an example of the hardware configuration of each of the learning devices 11, 21, 31 and the signal estimation devices 12, 22, 32 according to the respective embodiments. As illustrated in FIG. 6 byway of example, each of the learning devices 11, 21, 31 and the signal estimation devices 12, 22, and 32 in this example includes a CPU (Central Processing Unit) 10*a*, an input unit 10*b*, an output unit 10*c*, and a RAM (Random Access Memory) 10*d*, a ROM (Read Only Memory) 10*e*, an auxiliary storage device 10*f*, and a bus 10*g*. The CPU 10*a* in this example includes a control unit 10*aa*, a computation unit 10*ab*, and a register 10*ac*, and executes various computation processing according to various programs read into the register 10*ac*. Further, the input unit 10*b* is an input terminal into which data is input, a keyboard, a mouse, a touch panel, or the like. Further, the output unit 10*c* is an output terminal from which data is output, a display, a LAN card controlled by the CPU 10*a* that has read a predetermined program, or the like. Further, the RAM 10*d* is an SRAM (Static Random Access Memory), a DRAM (Dynamic Random Access Memory), or the like, and has a program area 10*da* in which a predetermined program is stored and a data area 10*db* in which various data is stored. Further, the auxiliary storage device 10*f* is, for example, a hard disk, MO (Magneto-Optical disc), a semiconductor memory, or the like, and has a program area 10*fa* in which a predetermined program is stored and a data area 10*fb* in which various data is stored. Further, the bus 10*g* connects the CPU 10*a*, the input unit 10*b*, the output unit 10*c*, the RAM 10*d*, the ROM 10*e*, and the auxiliary storage device 10*f* so that they can exchange information. The CPU 10*a* writes the program stored in the program area 10*fa* of the auxiliary storage device 10*f* to the program area 10*da* of the RAM 10*d* according to a read OS (Operating System) program. Similarly, the CPU 10*a* writes various data stored in the data area 10*fb* of the auxiliary storage device 10*f* to the data area 10*db* of the RAM 10*d*. Then, the address on the RAM 10*d* in which the program or data is written is stored in the register 10*ac* of the CPU 10*a*. The control unit 10*ab* of the CPU 10*a* sequentially reads out the addresses stored in the register 10*ac*, reads a program or data from the area on the RAM 10*d* indicated by the read address, causes the computation unit 10*ab* to sequentially execute the computations indicated by the program, and stores the computation result in the register 10*ac*. With such a configuration, the functional configurations of the learning devices 11, 21, 31 and the signal estimation devices 12, 22, 32 are realized.

The above-mentioned program may be stored in a computer-readable storage medium in advance. An example of the computer-readable storage medium is a non-transitory storage medium. Examples of such a storage medium include a magnetic storage device, an optical disk, a magneto-optical storage medium, a semiconductor memory, and the like.

The distribution of such a program is performed, for example, by selling, transferring, or renting a portable storage medium such as a DVD or CD-ROM in which the program is stored. Furthermore, the program may be stored in a storage device of a server computer so that the program can be distributed by being transferred from the server computer to another computer via a network. As described above, a computer that executes such a program first temporarily stores, for example, the program stored in a portable storage medium or the program transferred from a server computer in its own storage device. Then, when processing is executed, the computer reads the program stored in its own storage device and executes the processing according to the read program. Further, as another execution form of this program, a computer may read the program directly from a portable storage medium and execute processing according to the program, and also, every time the program is transferred from a server computer to this computer, processing according to the received program may be executed sequentially. Further, the above-mentioned processing may be executed by a so-called ASP (Application Service Provider) type service, which implements processing function only by executing a program in accordance with an instruction and acquiring a result without transferring the program from a server computer to this computer. Note that the program in this form includes information to be used for processing performed by a computer and equivalent to the program (data that is not a direct command to the computer but has a property for defining the processing of the computer, etc.).

Further, in each embodiment, the present device is configured by executing a predetermined program on a computer, but at least a part of these processing contents may be realized by hardware.

[Other Variations]

Note that the present invention is not limited to the above-described embodiments. For example, the layer structures included in the multilayer structure of the neural network may not all the same. For example, the multilayer structure of the neural network may include two or more types different from each other of (1) a layer composed of a CNN, (2) a layer composed of a Gated CNN, and (3) a layer having the attention structure.

The various types of processing described above may not only be executed in chronological order according to the description, but may also be executed in parallel or individually as required or depending on the processing capacity of the device that executes the processing. In addition, it goes without saying that modifications can be made as appropriate without departing from the spirit of the present invention.

REFERENCE SIGNS LIST

11, 21, 31 Learning device
12, 22, 32 Signal estimation device

The invention claimed is:

1. A computer implemented method for learning a neural network, comprising:
- learning a neural network using learning data, wherein the learning data comprises:
  - a low-bit signal obtained by quantizing an analog input signal to the low-bit signal expressed in a first number of quantization bits, and
  - a high-bit signal obtained by quantizing the analog input signal to the high-bit signal expressed in a second number of quantization bits larger than the first number of quantization bits,
- the learning the neural network further comprises:
  - receiving, as an input digital signal, the low-bit signal and creating an estimated output signal by transforming the low-bit signal expressed in the first number of quantization bits to the estimated output signal expressed in the second number of quantization bits, and
  - learning a parameter of the neural network by minimizing difference between the estimated output signal and the high-bit signal according to a value of a loss function by performing iterative back-propagation operations,
- the neural network comprises the multilayer structure including a layer that determines the output signal based on the input signal,
- the output signal is determined based at least on a product of a first column of a plurality of values obtained by performing a first convolution linear transformation processing on the input signal and a second column of a plurality of values obtained by performing a second convolution linear transformation processing on the input signal based on a value,
- the output signal includes a product A×V', where A represents a column corresponding to a product of a column K of a plurality of values obtained by performing convolution linear transformation processing $W_K$ on the input X and a column Q of a plurality of values obtained by performing convolution linear transformation processing $W_Q$ on the input signal, and V' represents a column of a plurality of values obtained by performing convolution linear transformation processing $W_V$ on the input signal,
- the learnt neural network comprises the multilayer structure including an input layer and an output layer,
- the input layer receives an input digital signal expressed in the first number of quantization bits,
- the output layer creates an output digital signal expressed in the second number of quantization bits, and
- the learnt neural network outputs the estimated output signal expressed in the second number of quantization bits by adding the output signal from the output layer to the input digital signal.

2. The computer implemented method according to claim 1, further comprising:
- inputting another low-bit input signal quantized to the first number of quantization bits to the learnt neural network; and
- obtaining and outputting another estimated signal quantized to the second number of quantization bits.

3. A learning device comprising a processor configured to execute operations comprising:
- learning a neural network that uses learning data, wherein the learning data comprises:
  - a low-bit signal obtained by quantizing an analog input signal to the low-bit signal expressed in a first number of quantization bits, and
  - a high-bit signal obtained by quantizing the analog input signal to the high-bit signal expressed in a second number of quantization bits larger than the first number of quantization bits,
- the learning the neural network further comprises:
  - receiving, as an input digital signal, the low-bit signal,
  - creating an estimated output signal by transforming the low-bit signal expressed in the first number of quantization bits to the estimated output signal expressed in the second number of quantization bits, and
  - learning a parameter of the neural network by minimizing difference between the estimated output signal and the high-bit signal according to a value of a loss function by performing iterative back-propagation operations, the neural network comprises the multilayer structure including a layer that determines the output signal based on the input signal, the output signal is determined based at least on a product of a first column of a plurality of values obtained by performing a first convolution linear transformation processing on the input signal and a second column of a plurality of values obtained by performing a second convolution linear transformation processing on the input signal based on a value, the output signal includes a product A×V', where A represents a column corresponding to a product of a column K of a plurality of values obtained by performing convolution linear transformation processing $W_K$ on the input X and a column Q of a plurality of values obtained by performing convolution linear transformation processing $W_Q$ on the input signal, and V' represents a column of a plurality of values obtained by performing convolution linear transformation processing $W_V$ on the input signal, the learnt neural network comprises a multilayer structure including an input layer and an output layer, the input layer receives an input digital signal expressed in the first number of quantization bits, the output layer creates an output digital signal expressed in the second number of quantization bits, and the learnt neural network outputs the estimated output signal expressed in the second number of quantization bits by adding the output digital signal from the output layer to the input digital signal.

4. A signal estimation device comprising a processor executing a computer-executable instructions that cause the signal estimation device to perform operations comprising:

receiving, as input to a neural network that has been trained, a low-bit input signal obtained by quantizing an analog input signal to the low-bit input signal expressed in a first number of quantization bits, wherein the neural network has been trained by using training data to transform the low-bit input signal expressed in the first number of quantization bits to an estimated output signal as a high-bit signal expressed in a second number of quantization bits, the neural network comprises a multilayer structure including an input layer and an output layer, the neural network comprises the multilayer structure including a layer that determines the output signal based on the input signal, the output signal is determined based at least on a product of a first column of a plurality of values obtained by performing a first convolution linear transformation processing on the input signal and a second column of a plurality of values obtained by performing a second convolution linear transformation processing on the input signal based on a value, the output signal includes a product A×V', where A represents a column corresponding to a product of a column K of a plurality of values obtained by performing convolution linear transformation processing $W_K$ on the input X and a column Q of a plurality of values obtained by performing convolution linear transformation processing $W_Q$ on the input signal, and V' represents a column of a plurality of values obtained by performing convolution linear transformation processing $W_V$ on the input signal, the neural network has been further trained by learning a parameter of the neural network by minimizing difference between the estimated output signal and the high-bit signal according to a value of a loss function by performing iterative backpropagation operations, and the second number of quantization bits larger than the first number of quantization bits;

creating, by the neural network that has been trained, the estimated output signal expressed in the second number of quantization bits by adding an output signal from the output layer to the low-bit input signal; and outputting the estimated output signal.

5. The computer implemented method according to claim 1, wherein the low-bit signal corresponds to a music signal that is quantized based on an analog-digital conversion.

6. The computer implemented method according to claim 1, wherein the low-bit signal corresponds to a sensor signal associated with a robot.

7. The computer implemented method according to claim 1, wherein the first number of quantization bits is substantially close to 16 bits, and wherein the second number of quantization bits is substantially close to 24 bits.

8. The computer implemented method according to claim 1, wherein the multilayer structure includes at least three layers.

9. The learning device according to claim 3, the processor further configured to execute a method comprising:

inputting another low-bit input signal quantized to the first number of quantization bits to the learnt neural network; and obtaining and outputting another estimated signal quantized to the second number of quantization bits larger than the first number of quantization bits.

10. The learning device according to claim 3, wherein the low-bit signal corresponds to a music signal that is quantized based on an analog-digital conversion.

11. The learning device according to claim 3, wherein the low-bit signal corresponds to a sensor signal associated with a robot.

12. The learning device according to claim 3, wherein the first number of quantization bits is substantially close to 16 bits, and wherein the second number of quantization bits is substantially close to 24 bits.

13. The learning device according to claim 3, wherein the multilayer structure includes at least three layers.

14. The signal estimation device according to claim 4, wherein the low-bit input signal corresponds to a music signal that is quantized based on an analog-digital conversion.

15. The signal estimation device according to claim 4, wherein the low-bit input signal corresponds to a sensor signal associated with a robot.

* * * * *